July 2, 1963 W. D. MACGEORGE 3,095,732
YIELD POINT DETECTING MEANS
Filed Jan. 19, 1960

INVENTOR.
William D. Macgeorge
BY Wm. R. Glisson
ATTORNEY

United States Patent Office 3,095,732
Patented July 2, 1963

3,095,732
YIELD POINT DETECTING MEANS
William D. Macgeorge, Berwyn, Pa., assignor to The Budd Company, Philadelphia, Pa., a corporation of Pennsylvania
Filed Jan. 19, 1960, Ser. No. 3,315
8 Claims. (Cl. 73—88)

This invention relates to yield point detecting means for specimen testing machines and has for an object the provision of improvements in this art.

The detecting means of this invention operates in conjunction with recorders of the type shown in Patents Nos. 2,091,534 and 2,721,109.

One of the particular objects is to provide means for detecting the yield point of a specimen and furnishing an indication of it.

Another object is to provide means for setting the apparatus for the amount of deviation required to produce the indication or signal at the yield point.

Another object is to provide means for setting up the slope of the stress-strain line in preparation for producing an indication of the yield point.

Another object is to provide automatic means for setting up the slope characteristics in an indicating circuit.

The above and other objects and features of the invention will be apparent from the following description of an exemplary embodiment thereof, reference being made to the accompanying drawings, in which.

Figure 1:
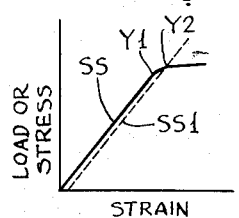
FIG. 1 is a stress-strain diagram, such as would be made by an X—Y recorder, showing the slope and the yield point.

In FIG. 1 the stress or load is plotted on the Y axis and the strain on the X axis. The solid line diagram is representative of a curve plotted by an X—Y recorder such as those commercially available from Electro Instruments, Inc. or Minneapolis-Honeywell Regulator Co., or the referenced patents above but does not constitute a part of this invention. The solid line SS is the stress-strain diagram of a given specimen showing the slope in the elastic range as a straight line and the yield point Y1 where the line departs from straight. This point on the curve may be a radical departure from the slope, as shown, or may be a deviation so slight as to be difficult to observe visually. The parallel broken line SS1 represents a setting of comparator means hereby provided which includes R2 cooperating with RL2 and the load circuit of R5. The point Y2 at intersection of the solid line and the broken line is that at which the desired indication is given.

The comparison circuit and its functions will be described together.

For certain materials or specimens it is desirable to provide an indication or to "print out" the load value (stress) when the strain (change in length) reaches a predetermined setting. For example, it is common acceptance test practice to evaluate a specimen under load at one half of one percent elongation. For a two inch specimen this would be .010 inch elongation. Herein potentiometer R1 is operated (adjusted) by a conventional stress-strain or "X—Y" recorder in response to strain by the simple expedient of coupling R1 to the strain drive motor of the X—Y recorder. A bridge resistance or potentiometer R4 in parallel with R1 is set to the desired maximum strain. For example, if R1 is coupled to its strain motor drive to give full sweep when a two inch specimen elongates .020 inch, the sweeper of R4 may be set at midpoint to energize relay RL1 at .010 inch or one half of one percent elongation. Operating as an A.C. bridge, R1 and R4 produce an output to tube T1 which is sensed by a phase sensitive relay RL1 when the amplifier tube T1 cuts off during the positive half cycle of transformer 11. Current is supplied to both the relay and the tube circuit by an alternator 10 through a transformer 11.

When a pre-set strain, set as a divisional part of R4 on potentiometer R1, is reached relay RL1 operates to actuate any desired indicating or recording equipment which will show the load applied to the specimen when this pre-set strain was reached.

Alternatively, for many materials it is desirable to "print out" the load when the stress-strain curve deviates from a given slope by a predetermined amount, called "offset." For example, it is common acceptance test practice to evaluate a specimen under load and to determine the load at a value where stress is no longer proportional to strain, and deviates from this constant slope relation by some value less than one percent. Often this value is only .2 of one percent and is difficult to determine by visual means.

Potentiometer R5 is operated or adjusted in accordance with the load or stress axis value of a stress-strain recorder by the simple expedient of coupling R1 to the stress (load) drive motor of the X—Y recorder. The input across R5 is controlled by the ratio or slope potentiometer R6 in combination with resistors R7 and R8, which resistors characterize the effect of the potentiometer R6 but are not indispensable to its operation. Potentiometer R6 controls the input to R5 over a wide range, for example from 3N to $$\frac{N}{3}$$

volts giving ratios of slope of the stress-strain curve from 3:1 to .33:1. A slope of 3:1 would represent three increments of load value on the stress-strain curve of the X—Y recorder for every one increment of strain value. The slope illustrated in FIG. 1 is for a stress-strain slope of 1:1; assuming the values of R1 and R5 to be equal, R6 would be adjusted to a value to give a voltage drop across R5 equal to the voltage drop across R1. Since the transformer coupling 3N for R5 is generating a voltage three times the transformer coupling N for R1, R6 must be set to attenuate approximately two thirds of the voltage generated by 3N in order to achieve a 1:1 slope.

The output of R5 is compared with that of R1 and registered by a phase sensitive relay RL2. Offset potentiometer R2 with a limiting resistor R3 provides a means for adjusting the degree of deviation from a given slope required to cause RL2 to operate. For example, assume the slope condition of stress-strain to be 1:1 as shown in FIG. 1. This means that R1 and R5 on the linear portion of the slope curve, will be traversed by their sweepers as if acting in tandem. Full sweep of R5 represents full scale deflection of the Y recorder drive and full scale deflection of the X recorder drive causes full sweep of R1. The voltage on the grid of tube T3 is always biased positive some voltage called "offset" at potentiometer R2. Assume R2 to be offset two volts for illustration purposes and R1 and R5 are on the linear portion of the stress-strain curve. The sweeper of R1 is at ground by definition. Also by definition of 1:1 slope, the voltage drop across the bottom portions of potentiometers R1 and R5 is equal. The series circuit from ground to the sweeper of R1, to the bottom of R1, to the bottom of R2 to the sweeper of R2, to the bottom of R5, to the sweeper of R5 is A.C. coupled to the grid of tube T3. This grid circuit is biased down by R1 and up by R5 compensating amounts, but R2 biases the grid up two volts causing tube T3 to remain on. When R1 advances faster than R5, which is the non-linear slope condition, the grid of tube T3 is biased down by R1 an amount greater than the up bias of R5, until the R1 bias overcomes the two volts offset of R2. At this point the grid of tube T3 cuts off T3 sending a positive signal to the grid of tube T4, thus energizing the RL2 circuit. RL2 operates independent of the circuit of RL1 and neither is affected by the operation of the other.

In service R2 is first set to zero output by adjusting the sweeper of R2 to the bottom of R2 when the sweeper of R1 is at its bottom position. And a specimen to be tested is loaded in a testing mechine without indicatable load, just enough to take the mechanical back-lash out of the testing machine system. The stress and strain values are then accurately zeroed on the X—Y recorder. All standard X—Y recorders are provided with means for setting the drive motors and indicators to the origin of X—Y coordinates, and the procedure of zeroing the instrument does not require explanation here. Then the specimen is loaded within its elastic range, say about 10%, and the slope of the stress-strain curve registered on the X—Y recorder to first check the recorder drive mechanism. The ratio potentiometer R6 is then adjusted until relay RL2 is actuated. Since R2 is at zero offset when this adjustment is made it is obvious the negative bias of the bottom of R1 just equals the positive bias of the bottom of R5 causing the voltage on the grid of tube T3 to drop just enough to cut off tube T3 and energize the circuit of relay RL2. This sets up the proper slope, or input to R5, so that the detecting circuit (RL2 etc.) will remain undisturbed unless the slope ratio changes to a lower value, indicating the yield or failure point of the specimen.

The offset potentiometer R2 is then adjusted to shift the zero of the comparison circuit system so that the slope will have to deviate by this pre-set or predetermined amount before RL2 operates.

The test is then continued and when RL2 is operated the load will be printed out by RL2, the relay being energized through the transformer 11 indicating the load point where curves SS and SS1 intersect.

Figure 2:
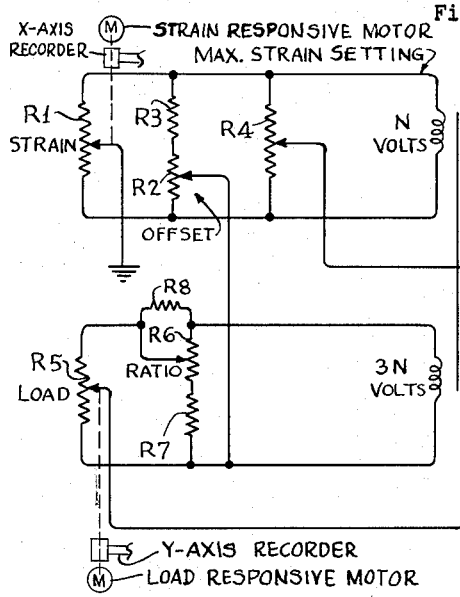
FIG. 2 is a wiring diagram of a circuit embodying the invention.
Figure 2:
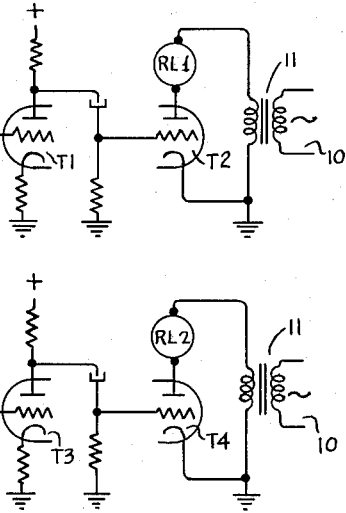
Figure 3:
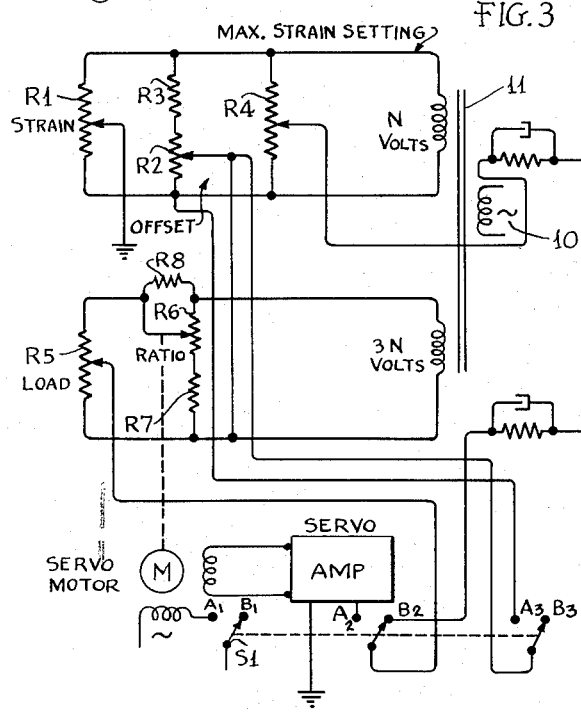
FIG. 3 is a diagram like FIG. 2 which has added means for automatically setting for the slope of the curve.
Figure 3:
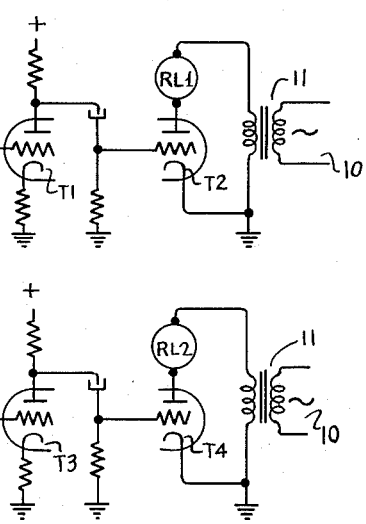

FIG. 3, which is an addition to FIG. 2, shows automatic means for setting the ratio potentiometer R6 instead of setting it by hand. When gang switch S1 is on contacts A a servo-motor M will adjust R6 to the proper slope for causing RL2 to operate; and when switch S1 is moved to contacts B the servo-motor will be left in the adjusted position and relay RL2 will be actuated, as before. The three gang arms of the switch S1 are used respectively to supply power to operate the servo-motor M to transfer the circuit of RL2 into the motor control circuit and to return it to RL2 from the arm of R5, and to cut out the offset or bias resistance of R2 and return it to circuit. As shown in FIG. 3 the servo amplifier supplies the electrical signal to position motor M. The $A_3$ contact shorts out the R2 offset and effectively removes the offset voltage so that the adjustment can be made as explained above. The $A_2$ contact supplies the voltage of the center tap of $R_5$ to the servo amplifier which is automatically balanced to ground level or the level of the center tap of $R_1$. The $A_1$ contact supplies power to the servo motor to facilitate operation thereof. When gang switch S1 is again returned to its B position, R2 is again in the balance circuit at its correct offset position, and the test may proceed with both the slope and offset correctly adjusted.

It is thus seen that the invention provides improved means for detecting the yield point of a test specimen and for providing a signal thereof.

While certain embodiments of the invention have been described for purposes of illustration it is to be understood that there may be various embodiments and modifications within the scope of the invention.

What is claimed is:

1. In an electronic circuit having a voltage source for energizing a print-out utilization device at a predetermined elongation of a specimen, an X—Y recorder having a strain drive motor, a first potentiometer having two fixed connections and a movable connection, said movable connection being mechanically coupled to said strain drive motor to give full sweep movement for a known elongation of said specimen, a second potentiometer having two fixed connections in parallel with said fixed connections of said first potentiometer and said voltage source and having a movable connection settable as a voltage divider for a predetermined elongation to provide a critical change in voltage when the movable connection of said first potentiometer reaches the same proportional setting as the movable connection of said second potentiometer, a utilization circuit connected to said movable connection of said second potentiometer for sensing the critical change of voltage at said second potentiometer, and a utilization device connected to the utilization circuit and responsive to said change in voltage at said predetermined elongation to indicate a predetermined yield point of said specimen.

2. An electronic circuit having a voltage source for energizing a print-out utilization device at a predetermined yield point of a specimen, an X—Y recorder having a strain drive motor and a stress drive motor, a first potentiometer having two fixed connections and a movable connection, said movable connection being mechanically coupled to said strain drive motor, a second potentiometer having two fixed connections and a movable connection, said movable connection being coupled to said stress drive motor, a voltage source connected in parallel to said fixed connections of said potentiometers, a third potentiometer having two fixed connections connected in parallel with said fixed connections of said first potentiometer, said third potentiometer having a movable connection connected in series with one of said fixed connections of said second potentiometer, the movable connection of said first and said second potentiometers being driven by said drive motors in a fixed proportionate ratio before said specimen reaches a yield point, said movable connection of said first potentiometer being driven at an increased rate lowering said fixed ratio at said yield point, a utilization circuit coupled to the movable connection of said second potentiometer for sensing a predetermined voltage difference caused by the change in said fixed ratio, and a utilization device responsive to said voltage difference to indicate a predetermined yield point of said specimen.

3. An electronic circuit as set forth in claim 2 in which said utilization circuit includes a phase sensitive relay for operation as a utilization device to indicate the load and strain at the yield point of said test specimen.

4. An electronic circuit as set forth in claim 2 wherein said voltage source includes a separate transformer winding for each said potentiometer, and a ratio attenuation potentiometer in series between one of said potentiometers and said voltage source for making compensating adjustments for different drive ratios of said potentiometers.

5. An electronic circuit as set forth in claim 2 which further includes a ratio attenuation potentiometer in series between one of said first or second potentiometers and said voltage source for making compensation adjustments for different drive ratios of said first and second potentiometers, and a servo motor mechanically connected to said ratio attenuation potentiometer, said servo motor being electrically connectable to the sweeper of said first or second potentiometer to adjust the voltage at the sweepers of one of said first or second potentiometers until they are equal.

6. An electrical circuit for determining a predetermined elongation of a test specimen by the percentage elongation method comprising, a strain responsive motor operable to drive in proportion to the elongation of a test specimen, a first potentiometer having two fixed connections and a movable connection, said movable connection being mechanically driven by said strain responsive motor, a voltage source electrically connected to said fixed connections of said first potentiometer creating a voltage gradient across said first potentiometer, said movable connection of said first potentiometer being electrically grounded at said movable connection to create a fixed reference voltage, a second potentiometer having two fixed connections and a movable connection, said fixed connections of said second potentiometer being electrically connected to said voltage source, said movable connection of said second potentiometer being mechanically adjustable for a predetermined elongation to establish a yield point reference voltage differing from said fixed reference voltage, and switch means electrically connected to the movable connection of said second potentiometer, said switch means being responsive to said fixed reference voltage produced at the movable connection of said second potentiometer by the movement of said movable connection of said first potentiometer to indicate a predetermined yield point of said specimen.

7. An electrical circuit for determining a predetermined elongation of a test specimen by the percentage elongation method comprising, an X—Y stress-strain recorder having a strain responsive motor, said motor being operable to drive proportional to the elongation imposed on a test specimen, a first strain potentiometer having two fixed connections and a movable connection, said movable connection being mechanically coupled to said strain responsive motor and electrically connected to a fixed level of a voltage source to create a reference voltage, said voltage source being electrically connected across said fixed connections of said first potentiometer creating a voltage gradient thereacross, a second potentiometer having two fixed connections and a movable connection, said movable connection being operable as a voltage divider and mechanically adjustable for a predetermined elongation of said specimen, said fixed connections of said second potentiometer being electrically connected in parallel with said fixed connections of said first potentiometer and said voltage source, and electrical switch means connected to said movable connection of said second potentiometer operable at a voltage level corresponding to said predetermined elongation set at said movable connection of said second potentiometer to indicate a predetermined yield point of said specimen.

8. An electronic circuit for determining the yield point of a test speciment by the percentage offset method comprising, a strain responsive motor operable to drive in proportion to the strain imposed on a test specimen, a load responsive motor operable to drive in proportion to the stress imposed on a test specimen, voltage source means, a strain potentiometer having two fixed connections and a movable connection, said movable connection being mechanically coupled to said strain responsive motor to drive the movable connection of the strain potentiometers, said fixed connections of said strain potentiometer being electrically connected with said voltage source means to create a voltage gradient thereacross, a load potentiometer having two fixed connections and a movable connection, said movable connection being mechanically coupled to said load responsive motor to drive the movable connection of said load potentiometer, said fixed connections of said load potentiometer being electrically connected with said voltage source means to create a voltage gradient thereacross, a strain offset potentiometer having two fixed connections and a movable connection, said fixed connections of said strain offset potentiometer being electrically connected in parallel with said fixed connections of said strain potentiometer, said movable connection of said offset potentiometer being electrically connected in series between a fixed connection of said strain potentiometer and a fixed connection of said load potentiometer to create a voltage gradient between said strain potentiometer and said load potentiometer, and switch means connected in series with said movable connection of said load potentiometer said movable connection of said offset potentiometer and said movable connection of said strain potentiometer for operation when the sum of the voltages of said series connected potentiometers is substantially reduced to zero voltage at said switch means.

References Cited in the file of this patent
UNITED STATES PATENTS

| 2,721,109 | Ross | Oct. 18, 1955 |
| 2,775,886 | Lathrop et al. | Jan. 1, 1957 |
| 2,830,453 | Jones | Apr. 15, 1958 |
| 2,930,223 | Lathrop | Mar. 29, 1960 |
| 2,945,527 | Bower et al. | July 19, 1960 |